(12) United States Patent
Palaoro

(10) Patent No.: US 9,109,709 B2
(45) Date of Patent: Aug. 18, 2015

(54) RESIDUAL PRESSURE VALVE

(75) Inventor: Renato Palaoro, Heidenheim (DE)

(73) Assignee: Alligator Ventilfabrik GmbH, Giengen (DE)

( * ) Notice: Subject to any disclaimer, the term of this patent is extended or adjusted under 35 U.S.C. 154(b) by 6 days.

(21) Appl. No.: 13/981,703

(22) PCT Filed: Feb. 28, 2012

(86) PCT No.: PCT/EP2012/053299
§ 371 (c)(1),
(2), (4) Date: Jul. 25, 2013

(87) PCT Pub. No.: WO2012/116964
PCT Pub. Date: Sep. 7, 2012

(65) Prior Publication Data
US 2013/0319544 A1    Dec. 5, 2013

(30) Foreign Application Priority Data
Feb. 28, 2011    (DE) ............ 20 2011 003 322 U

(51) Int. Cl.
*F16K 17/26*    (2006.01)
*F16K 1/30*    (2006.01)
*F16K 15/02*    (2006.01)
*F16K 17/18*    (2006.01)

(52) U.S. Cl.
CPC ............ *F16K 1/307* (2013.01); *F16K 15/025* (2013.01); *F16K 17/18* (2013.01)

(58) Field of Classification Search
USPC .............. 137/493, 493.9, 509, 540, 543.19; 251/356
See application file for complete search history.

(56) References Cited

U.S. PATENT DOCUMENTS

| 2,256,139 | A | * | 9/1941 | Craig ............................. 62/145 |
| 2,804,881 | A | | 9/1957 | Seid et al. |
| 3,067,770 | A | * | 12/1962 | Fancher ....................... 137/493 |
| 3,580,274 | A | * | 5/1971 | Hansen ......................... 137/493 |
| 4,072,165 | A | | 2/1978 | Bradley, Jr. |
| 5,295,502 | A | * | 3/1994 | Lane .......................... 137/315.04 |
| 6,910,502 | B2 | * | 6/2005 | Landhuis ................. 137/565.35 |
| 8,037,899 | B2 | | 10/2011 | Matsubara et al. |
| 2011/0220215 | A1 | | 9/2011 | Schmitt et al. |

FOREIGN PATENT DOCUMENTS

| CN | 20687926 U | 1/1991 |
| CN | 201277296 Y | 7/2009 |

(Continued)

OTHER PUBLICATIONS

Chinese Office action for Chinese Application No. 201280010768.6 dated Sep. 3, 2014.

*Primary Examiner* — Kevin Murphy
*Assistant Examiner* — R. K. Arundale
(74) *Attorney, Agent, or Firm* — Bachman & LaPointe, P.C.

(57) ABSTRACT

A residual pressure valve (10; 10a; 10b) for a flow medium, in particular for air, the flow passage (30) of which is arranged in a valve housing (15) and is designed so as to allow flows to pass in different directions and so as to be interrupted by an at least partially movable sealing element (41; 41a) depending on the pressure of the flow medium, wherein an energy store (45) which is in particular designed as a pressure spring, the sealing element (41; 41a) is seated against a counter element (21; 21a) in a sealing manner when the flow medium drops below a minimum pressure in order to interrupt the flow passage (30), and wherein the flow path (30) has two separate bores (32, 58) which are arranged coaxially in relation to one another and are connected to one another by at least one connecting channel (33).

12 Claims, 2 Drawing Sheets

(56) References Cited

FOREIGN PATENT DOCUMENTS

| CN | 101576193 A | 11/2009 |
| CN | 101628533 A | 1/2010 |
| DE | 10045122 A1 | 5/2001 |
| EP | 0987475 B1 | 12/2005 |
| GB | 979441 | 1/1965 |
| WO | 2008052782 A1 | 5/2008 |

* cited by examiner

RESIDUAL PRESSURE VALVE

BACKGROUND OF THE INVENTION

The invention relates to a residual pressure valve.

Such a residual pressure valve is known from the applicant's EP 0 987 475 B1.

The known residual pressure valve which is able to allow flows to pass in different flow directions serves here for holding a particular residual pressure within a spring strut, which is acted upon by compressed air, in a motor vehicle. The residual pressure valve known from the said document has proved here to be a reliable valve in practice, which meets the requirements which are set. However, it is relatively complex in construction, in particular by the provision of several longitudinal bores constructed in longitudinal direction of the valve housing in one of the valve housing components, which bores are part of a flow passage for the flow medium.

It is therefore an object of the invention to further develop a residual pressure valve such that it is able to be produced particularly simply and precisely from production-orientated considerations.

SUMMARY OF THE INVENTION

The invention is based here on the idea in particular of replacing the longitudinal bores present in the prior art, which are produced by separate, machined manufacturing steps, with an annular space which is formed automatically on joining together of the two valve housing parts through the geometry of the valve housing parts and therefore does not require any separate processing or respectively production whatsoever.

Advantageous further developments of the residual pressure valve are indicated in the subclaims. All combinations of at least two of the features disclosed in the claims, the description and/or the figures fall within the scope of the invention.

A particularly simple and precise producibility of the counter element, which cooperates with the sealing element in order to block the flow path for the flow medium on dropping below a particular minimum pressure, is achieved when the counter element is formed by a wall section—of the first valve housing part—which is circumferential radially to the longitudinal axis of the valve housing.

In a first structural embodiment of the sealing element, provision is made here that the latter has in a recess on the side facing the wall section an O-ring which lies against the wall section in order to block the flow path. As the O-ring is a standard part, the manufacturing effort or respectively the manufacturing costs are thereby increased only relatively slightly and, moreover, it can be exchanged particularly simply in the case of failure.

Alternatively to an O-ring, however, it is also possible that the sealing element has on the side facing the wall section an annular or cylindrical seal consisting of elastic material, which seal lies with an end face against a sealing edge of the wall section in order to block the flow path. In particular through the construction of the sealing edge on the wall section a particularly high sealing effect is achieved here through a relatively high surface pressure between the sealing edge and the sealing element or respectively the seal.

To connect the two valve housing parts it is proposed in a first structural form that they are connected to one another by a screwed connection. Thereby, in particular a particularly simple assembly is made possible and, moreover, a disassembly of the valve housing or respectively a separating of the two valve housing parts again is possible with simple tools.

In order to enable a reliable and secure sealing of the valve housing toward the exterior in the case of the provision of a screwed connection between the two valve housing parts, in which at the same time no moisture or similar whatsoever can penetrate into the valve housing, it is proposed, moreover, that at least one of the two valve housing parts has optionally a radially circumferential flange region which acts as an axial stop on connecting of the two valve housing parts by means of the screwed connection, and that in the at least one flange region an annular recess is formed to receive a seal which is constructed as an O-ring. Furthermore, the flange-shaped region is effective for simplifying assembly.

In an alternative construction for the production of the connection of the two valve housing parts, it is proposed that the latter are connected to one another by a laser-welded connection. Such a connection has the particular advantage that, compared with a screwed connection, an additional sealing element (e.g. in the form of an O-ring) can be dispensed with.

In order to enable the axial position of the two valve housing parts in relation to one another without additional auxiliary means or respectively assembly aids on joining together of the two valve housing parts, it is proposed, moreover, in a structurally advantageous embodiment that one of the valve housing parts has a collar which is circumferential in a flange-shaped manner, against which, on joining of the two valve housing parts, the other valve housing part lies with an end face.

In a preferred manner with regard to production, this abutting region can be, at the same time, the region in which the laser-welded connection connects the two valve housing parts to one another.

In order to prevent leakage air from being emitted to the environment via the guidance of the sealing element, it is proposed, moreover, in a further preferred embodiment of the invention that the sealing element is constructed in the manner of a piston, and that the sealing element has an annular groove on a circumferential surface in the region of the mount in the first valve housing part, in which annular groove a sealing element, in particular in the form of an O-ring is arranged, which lies against the mount.

An embodiment is particularly preferred here in which an energy store is arranged in an energy store space which is connected with the environment by means of at least one vent bore. Thereby, it is prevented in particular that the counter-force which is able to be set by the energy store, via which the minimum pressure is set in the pressure store, is tampered with by inflowing air or respectively inflowing flow medium into the receiving space for the energy store.

BRIEF DESCRIPTION OF THE DRAWINGS

Further advantages, features and details of the invention will emerge from the following description of particularly preferred example embodiments and by means of the drawings.

These show in.

Identical components or respectively components with an identical function are provided with identical reference numbers in the figures.

DETAILED DESCRIPTION

Figure 1:
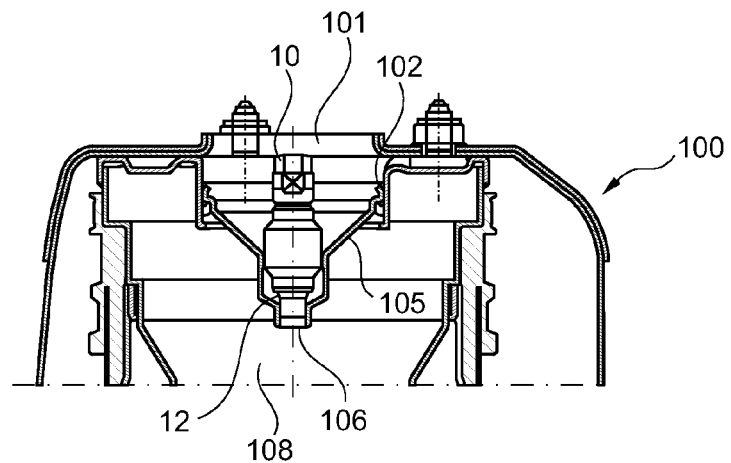
FIG. 1 a partial longitudinal section through the upper part of a spring strut, acted upon by compressed air and containing a residual pressure valve, in a motor vehicle, FIG. 2 and FIG. 3 a first example embodiment of the residual pressure valve according to the invention in different angular positions in side view respectively partially in section, FIG. 4 a second residual pressure valve, modified with respect to FIGS. 2 and 3, in a side view partially in section and FIG. 5 a third residual pressure valve, modified with respect to FIGS. 2 to 4, in a side view partially in section.

In a spring strut 100, acted upon by compressed air, illustrated only with its upper region in FIG. 1, for a motor vehicle, a funnel-like mounting 105 for a residual pressure valve 10 (which is also designated as residual pressure retention valve) is fixed at an apex opening 101 in the region 102. The residual pressure valve 10 is arranged with a screw neck 12 in a shaft-like opening 106 in the mounting 105. An in particular specific minimum residual pressure is to be guaranteed by the residual pressure valve 10 in a head space 108 of the spring strut 100. When this minimum residual pressure is reached, for example a pressure of 4 bar, the residual pressure valve 10 closes and therefore seals off the head space 108.

Figure 2:
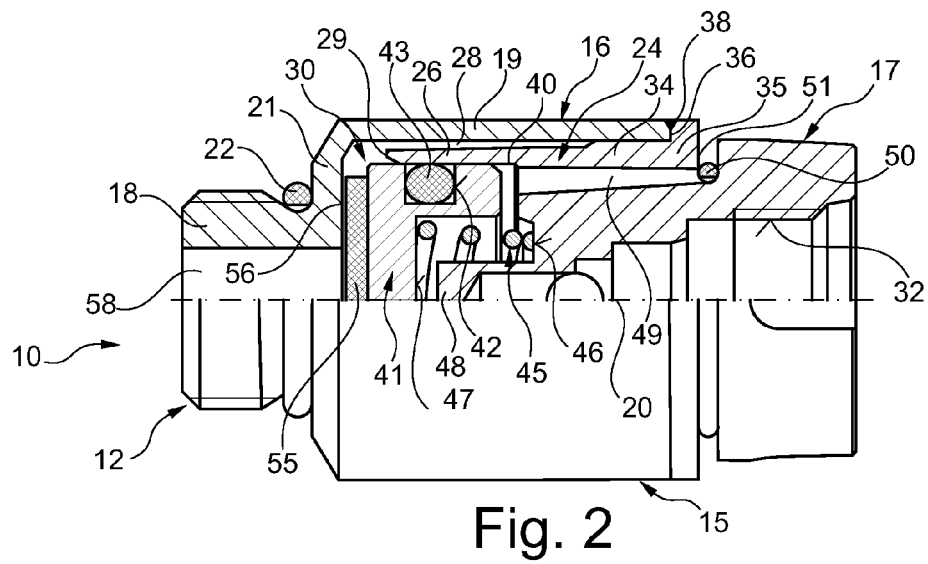
Figure 3:
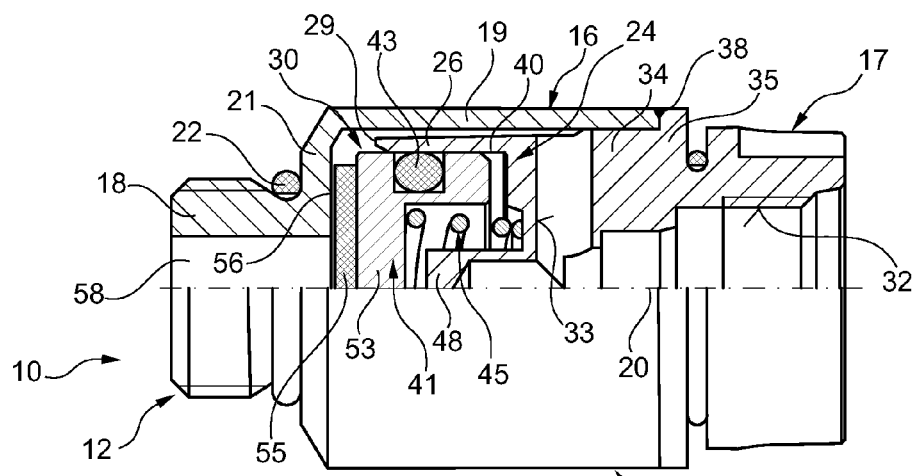

In FIGS. 2 and 3 the residual pressure valve 10 is illustrated in further detail in a first embodiment of the invention. The residual pressure valve 10 has a valve housing 15 which consists of two valve housing parts 16, 17 which are connected to one another. The first valve housing part 16, on which also the screw neck 12 is constructed, is constructed substantially in a sleeve shape and has a region 18 with the screw neck 12, which has a smaller diameter with respect to a region 19 of the valve housing part 16. The two regions 18, 19 are connected to one another by means of an annular wall section 21 arranged substantially perpendicularly to the longitudinal axis 20 of the residual pressure valve 10. At the end of the screw neck 12 facing away from the head space 108 in addition a sealing ring 22 is received in an annular groove in the transition region between the two regions 18, 19, which sealing ring seals toward the environment the residual pressure valve 10 which is screwed in the opening 106.

The second valve housing part 17 is likewise constructed approximately in a sleeve shape and projects with a section 24 into the region 19 of the first valve housing part 16. The section 24 has here a first region 26, the external diameter of which is smaller than the internal diameter of the region 19 of the first valve housing part 16, so that an annular space 28 is formed between the two regions 19 and 26, which is part of a flow path 30 for the flow medium, in particular for the air which is situated in the head space 108. The one end side 29 facing the region 18 of the first valve housing part 16 is arranged spaced apart axially with respect to the wall section 21 of the first valve housing part 16.

On the side of the second valve housing part 17 facing away from the screw neck 12 of the first valve housing part 16, said second valve housing part has a blind bore 32 consisting of several bore sections of different diameter. Preferably several connecting channels in the form of transverse bores 33, arranged at regular angular distances from one another, originate from the blind bore 32, of which only one transverse bore 33 can be seen in the figures. The transverse bore 33 opens out into the annular space 28 on the side facing away from the blind bore 32 and is also part of the flow path 30. The blind bore 32 is connected in particular via a threaded connection with a source of compressed air, preferably a compressed air compressor, via which the head space 108 of the spring strut 100 is acted upon with compressed air when the residual pressure valve 10 is opened.

In addition to the first region 26, the second valve housing part 17 has in section 24 a second region 34, the external diameter of which is enlarged with respect to the first region 26. In particular, the external diameter of the second region 34 corresponds substantially to the internal diameter of the region 19 of the first valve housing part 16, so that on axial joining together of the two valve housing parts 16, 17 the second valve housing part 17 is centred via the second region 34 to the first valve housing part 16. The second valve housing part 17 has in addition a circumferential collar 35 in the manner of a flange, which acts as an axial stop on joining together of the two valve housing parts 16, 17, as soon as the collar 35 lies against the end face 36 of the first valve housing part 16 which lies opposite the screw neck 12.

In order to connect the two valve housing parts 16, 17 to one another undetachably and, at the same time, in order to seal them, a welded connection with a radially circumferential weld seam 38 is formed in the transition region between the collar 35 and the end face 36, which weld seam is preferably formed by means of a laser beam device.

On the side lying opposite the blind bore 32, the second valve housing part 17 has a mount 40 for the sliding guidance of a sealing element 41 which is constructed in the manner of a piston. Here the sealing element 41, which is arranged so as to be movable along the longitudinal axis 20 of the residual pressure valve 10, has within the mount 40 an annular groove 42 constructed on its outer circumference, in which annular groove an O-ring 43 is arranged, which lies against the inner wall of the mount 40. Within the mount 40, furthermore, a pressure spring 45 is arranged which acts as an energy store, wherein the desired residual pressure of the residual pressure valve 10 is set via the geometry of the pressure spring 45 (length, diameter, spring stiffness etc.). The pressure spring 45 rests between the bottom 46 of the mount 40 and the base 47 of the cup-shaped sealing element 41, wherein a pin-like extension 48 of the second valve housing part 17 serves as a guide for the pressure spring 45.

As can be seen in particular by means of FIG. 2, at least one vent bore 49, which is funnel-shaped in the example embodiment, running in longitudinal direction, originates from the bottom 46 of the mount 40 in a radially outer region, in the flow path of which vent bore, situated in connection with the environment, in addition an O-ring 50 is arranged as a protective element against the penetration of dirt, moisture or similar into the mount 40, said O-ring being received in a recess 51 of the second valve housing part 17.

In the example embodiment illustrated in FIGS. 2 and 3, the piston base 53 of the sealing element 41 has on the side facing the screw neck 12 a round or respectively plate-shaped seal 55, which is constructed so as to be elastic or respectively consists of an elastic material. In the position of the sealing element 41 illustrated in FIGS. 2 and 3, the sealing element 41 is illustrated in a position in which it blocks the flow path 30. Here, the seal 55 cooperates with a radially circumferential sealing edge 56 which is constructed on the wall section 21 on the side facing the seal 55. Thereby, the desired (minimum) residual pressure is maintained in the head space 108 of the spring strut 100.

If, on the other hand, the residual pressure valve 10 or respectively its sealing element 41 is situated in a position in which the flow path 30 is freed, the seal 55 is arranged spaced apart axially from the sealing edge 56. Thereby, the compressed air situated in the head space 108 can arrive via the bore 58 constructed in the region of the screw neck 12 in the first valve housing part 16 and via the space between the wall section 21 and the seal 55 into the annular space 28, and from there via the transverse bores 33 into the blind bore 32 and the environment. Furthermore, with opened residual pressure valve 10 the head space 108 of the spring strut 100 can be filled with compressed air via the compressed air source (not illustrated). For this, the sealing element 41 or respectively the seal 55 is raised from its seal seat, contrary to the elastic force of the pressure spring 45, by the inflowing compressed air. The residual pressure valve 10 is therefore able to be flowed through in two directions over the flow path 30, and only forms a barrier in the case of falling below the residual pressure which is set via the pressure spring 45.

Figure 4:
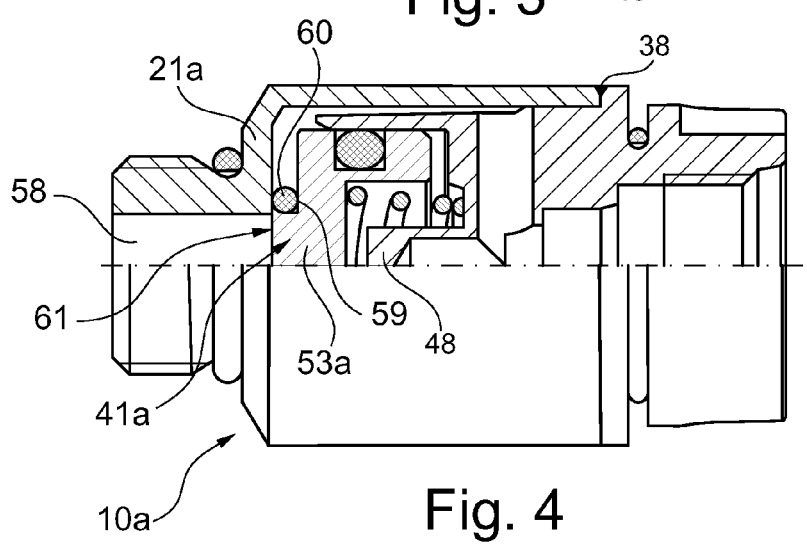

In FIG. 4 a modified embodiment of the invention is illustrated with a residual pressure valve 10a. The residual pressure valve 10a differs from the residual pressure valve 10 in the region of its sealing element 41a. Here, the sealing element 41a has a piston base 53a constructed in a stepped manner, in which an O-ring 60 is arranged in a radially circumferential mount 59, which O-ring is seated in a sealing manner against the wall section 21a of the valve housing 16a in the blocking position of the residual pressure valve 10a. If applicable, provision can be made here that the one end side 61 of the piston base 53a is likewise situated in abutting contact with the wall section 21a. It is also essential that the wall section 21a, in contrast to the wall section 21, has no sealing edge 56 as in the residual pressure valve 10.

Figure 5:
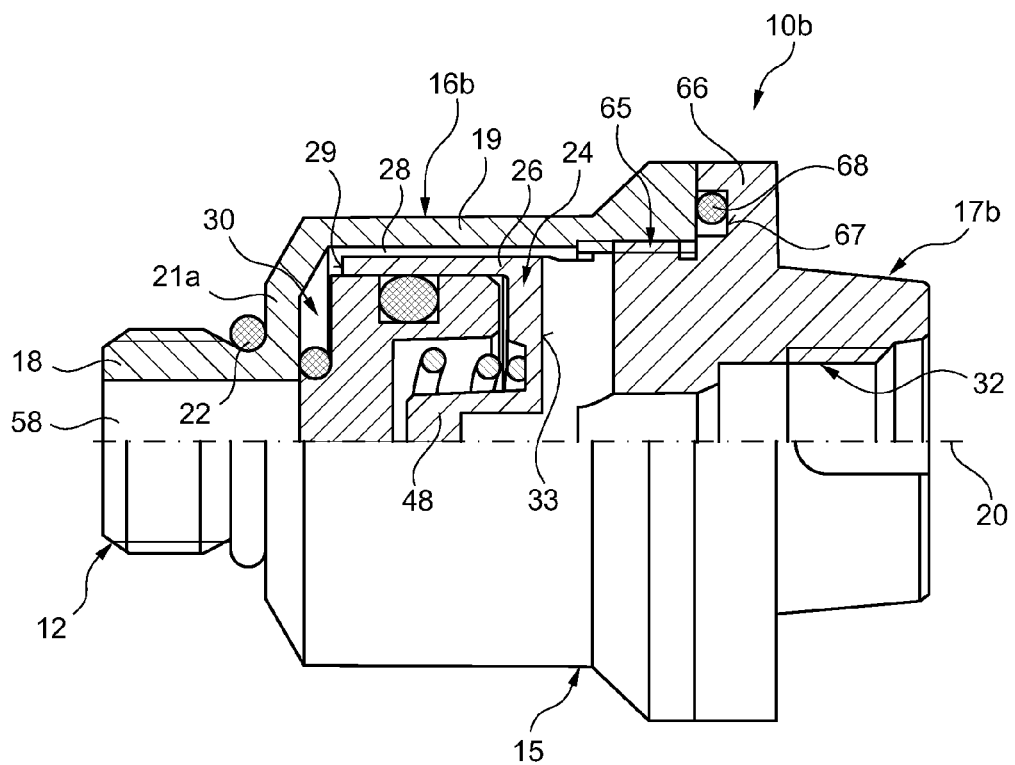

In FIG. 5 a residual valve 10b, which has once again been modified, is illustrated, which differs from the residual pressure valve 10a in that the two valve housing parts 16b, 17b are connected to one another by means of a screwed connection 65. Here, the second valve housing part 17b has a collar 66, circumferential in a flange-shaped manner, acting as axial stop, which collar carries on the side facing the first valve housing part 16b an O-ring 68 in an annular mount 67, which O-ring seals the screwed connection 65 toward the exterior on screwing of the two valve housing parts 16b, 17b. Of course, it is also possible to dispense with the O-ring 68 and to construct a seal for example by introducing an adhesive or a sealing material in the region of the screwed connection.

The residual pressure valves 10, 10a and 10b so far described can be altered or respectively modified in a variety of ways without departing from the idea of the invention.

The invention claimed is:

1. A residual pressure valve (10; 10a; 10b) for a flow medium, comprising: a flow passage (30) which is arranged in a valve housing (15) and is adapted to allow flow in a first or a second direction wherein the second direction is opposite to the first direction, wherein flow is interrupted by means of an at least partially movable sealing element (41; 41a) activated depending on a pressure of a flow medium, wherein an energy store means (45) is designed as a pressure spring and the sealing element (41; 41a) is seated against a counter element (21; 21a) in a sealing manner when the flow medium drops below a minimum pressure in order to interrupt the flow passage (30), wherein the flow passage (30) has two separate bores (32, 58) which are arranged coaxially in relation to one another and are connected to one another by at least one connecting channel (33), wherein the at least one connecting channel (33) is constructed in a first part (17; 17b) of the valve housing (15), which has a mount (40) for the at least indirect sliding guidance of the sealing element (41; 41a) and is adapted to receive the energy store means (45), and wherein the connection between a first bore of the two separate bores (58) and the at least one connecting channel (33) takes place via an annular space (28) which is arranged symmetrically to a longitudinal axis (20) of the valve housing (15) between the first part of the valve housing (17; 17b) and a second valve housing part (16; 16a; 16b) radially surrounding the valve housing first part (17; 17b) in a region of the flow path (30), wherein the sealing element (41; 41a) is arranged directly in the mount (40), and the energy store means (45) is arranged in a space formed by the mount (40) and the sealing element (41; 41a), which space is connected with the environment by means of at least one vent bore (49), wherein the counter element (21; 21a) is formed by a wall section (21a) of the second valve housing part (16) circumferential radially to the longitudinal axis (20) of the valve housing (15).

2. The residual pressure valve according to claim 1, wherein the sealing element (41a), on a side facing the wall section (21a), has a recess with a sealing element which lies against the wall section (21a) to block the flow path (30).

3. The residual pressure valve according to claim 1, wherein the sealing element (41) has on a side facing the wall section (21) a seal (55) consisting of elastic material, which seal lies with an end side against a sealing edge (56) of the wall section (21) to block the flow path (30).

4. The residual pressure valve according to claim 1, wherein the first and second valve housing parts (16b, 17b) are connected to one another by a screw connection (65).

5. The residual pressure valve according to claim 4, wherein at least one of the valve housing parts (16b, 17b) has a radially circumferential collar-like flange region (66), which acts as an axial stop when the first and second valve housing parts (16b, 17b) are connected by means of the screwed connection (65), and wherein at least one flange region (66) has an annular recess (67) formed to receive a seal (68).

6. The residual pressure valve according to claim 1, wherein the first and second housing parts (16; 16a, 17) are connected to one another by a welded connection.

7. The residual pressure valve according to claim 6, wherein the first valve housing part (17) has a collar (35) which lies on an end face of the second valve housing part.

8. The residual pressure valve according to claim 7, wherein the welded connection is formed in the region of the collar (35).

9. The residual pressure valve according to claim 1, wherein the sealing element (41; 41a) is constructed as a piston and has an annular groove (42) on a circumferential surface in the region of the mount (40) in the first valve housing part (17; 17b), the annular groove (42) is provided with a seal (45) which lies against the mount (40).

10. The residual pressure valve according to claim 1, wherein the at least one vent bore (49) opens into a mount (51) comprising an annular groove in which an O-ring (50) is arranged as a protective element.

11. The residual pressure valve according to claim 1, wherein several connecting channels (33) are provided and are arranged at radially equal angular distances from one another.

12. The residual pressure valve according to claim 1, wherein a second bore (32) of the two separate bores of the flow passage (30) is constructed as a blind bore, and in a region of a bottom of the blind bore (32) the first valve housing part (17; 17b) forms a pin-like extension (48) which serves for the guidance of the energy store comprising a pressure spring (45).

* * * * *